Sept. 21, 1926.  
W. O. WHITTENBERG  
DIRIGIBLE HEADLIGHT  
Filed May 3, 1924  
1,600,648
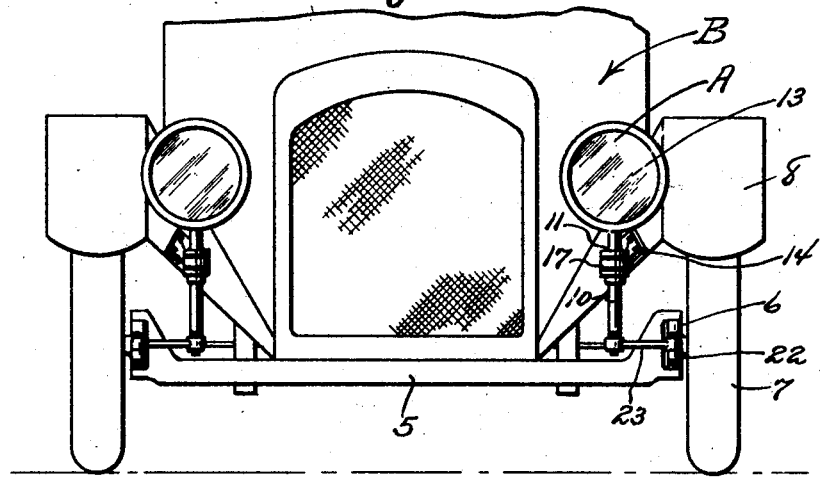
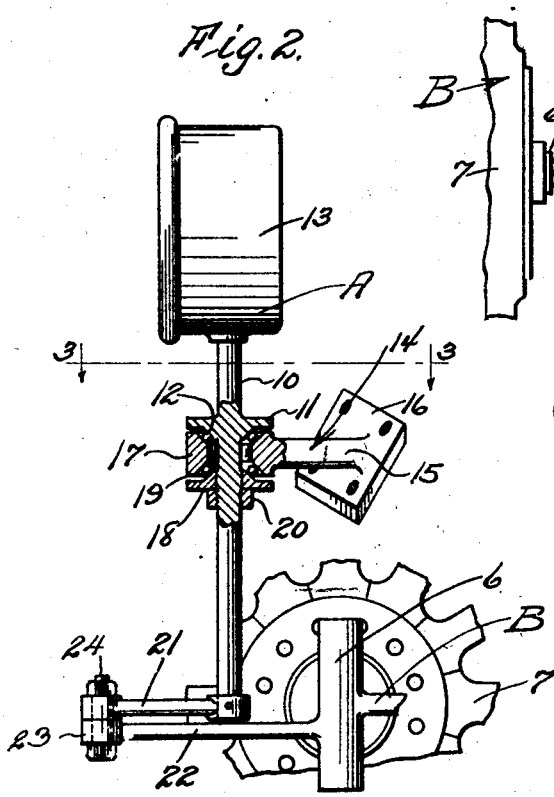
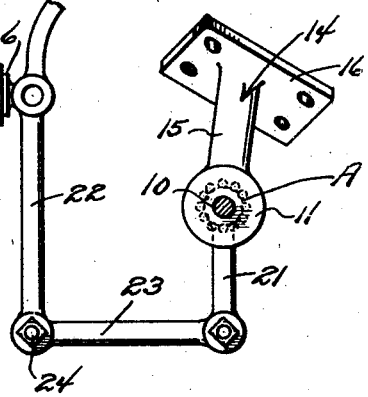
Inventor  
William O. Whittenberg  
By Richard B. Owen  
Attorney Patented Sept. 21, 1926.

1,600,648

UNITED STATES PATENT OFFICE.

WILLIAM O. WHITTENBERG, OF FOSS, OKLAHOMA.

DIRIGIBLE HEADLIGHT.

Application filed May 3, 1924. Serial No. 710,892.

This invention appertains to automobile appliances and the primary object of this invention is to provide novel means for turning the headlights of the automobile according to the direction of travel of the vehicle, thereby effectively insuring the correct illumination of the road while turning corners and the like.

Another primary object of the invention is the provision of novel means for rotatably mounting the headlight supporting standards on the vehicle and novel means for operatively connecting said standards with the steering gear of the vehicle, whereby upon turning movement of the front wheels, the headlights will be turned therewith.

A further object of the invention is to provide an improved automobile appliance of the above character, which will be durable and efficient in use, one which will be simple and easy to manufacture, and one which can be placed upon the market and incorporated with an automobile at a small cost.

With these and other objects in view, the invention consists in the novel construction, arrangement and formation of parts, as will be hereinafter more specifically described, claimed and illustrated in the accompanying drawings, in which drawings:

Figure 1 is a fragmentary side elevation of an automobile showing the improved dirigible headlights connected therewith, Figure 2 is a fragmentary vertical section through one of the dirigible headlights illustrating the means for rotatably supporting the lamp standard, and Figure 3 is a horizontal section taken on the line 3—3 of Figure 2 illustrating the novel means for operatively connecting the lamp standards with the steering mechanism of the automobile.

Referring to the drawings in detail, wherein similar reference characters designate corresponding parts throughout the several views, the letter A generally indicates the improved automobile appliance and B an automobile with which the same is associated.

The automobile B can be of any preferred character or make and embodies the usual front dead axle 5, the swinging front steering axles 6, the front steering wheels 7 arranged on the stub axles 6, and the front fenders 8 for the wheels 7.

The improved appliance A comprises vertically disposed lamp standards 10 which are arranged on each side of the motor vehicle and these standards are provided at a point intermediate their ends with annularly extending stop flanges 11. The lower faces of these annular stop flanges 11 have formed thereon bearing cones 12, for a purpose which will be hereinafter more fully described. The usual automobile headlights 13 are mounted on the standards 10 in any desired way, so that upon turning movement of the standards the headlights will be turned therewith.

In order to rotatably support the standards 10 supporting brackets 14 are provided and these supporting brackets 14 each embody supporting arms 15 which are formed on or secured to face plates 16 which extend at an angle to the arms and to the vertical. These face plates 16 are adapted to be secured to the fenders 8 of the automobile in any desired way. The forward terminals of the arms 15 are provided with bearing collars 17 through which the lamp standards 10 extend and these lamp standards 10 have adjustably supported thereon lower bearing cones 18 which are disposed adjacent to the bearing collars 17. The upper and lower faces of the bearing collars are provided with ball bearing races and these races receive ball-bearings 19 on which are adapted to rest the cones 12 and 18. The lower adjustable bearing cones 18 are held in their adjusted position by suitable supporting members 20.

The lower terminals of the standards 10 have keyed or otherwise secured thereto operatively extending crank arms 21, for a purpose, which will be hereinafter more fully described. In order to bring about the turning movement of the lamp standards 10 with the front wheels 7 of the automobile, the stub axles 6 have formed thereon or secured thereto in any desired way forwardly extending arms 22 and these arms terminate in transverse alignment with the crank arms 21. These arms 22 and 21 are operatively connected together by links 23 and it is to be noted that the links 23 are connected to the arms 22 and 21 by suitable pivot bolts or the like 24.

In use of the improved appliance, it can be seen that upon turning movement of the front steering wheels 7 through the usual steering mechanism, that the arms 22 will be moved therewith and that these arms will in turn transmit their motion to the crank arms 21 through the medium of the links 23. The turning movement of the crank arms 21 will of course rotate the lamp standards 10 thus turning the headlights 13 with the wheels 7. This of course will effectively illuminate the road while the vehicle is turning corners, which will effectively facilitate night travel on the road.

Changes in detail may be made without departing from the spirit or the scope of this invention, but:

What I claim as new is:

The combination with an automobile front fender, of a bracket extending forwardly from the angularly disposed wall of the fender and secured thereto, a collar formed integrally with the said bracket, a revoluble lamp support passing through the collar and being formed with an annular flange overlapping one end of the collar, an adjustable cone on the lamp support overlapping the other end of the collar and a nut on the support for adjusting the said cone toward or away from the collar, and means carried by the lamp support beneath the said adjustable cone and adjusting nut for rotating the same.

In testimony whereof I affix my signature.

WILLIAM O. WHITTENBERG.